US008265448B2

(12) United States Patent
Hayashi

(10) Patent No.: US 8,265,448 B2
(45) Date of Patent: Sep. 11, 2012

(54) ELECTRONIC APPARATUS, CONTENT REPRODUCING SYSTEM, CONTENT REPRODUCING METHOD, AND PROGRAM

(75) Inventor: Morihiko Hayashi, Kanagawa (JP)

(73) Assignee: Sony Corporation (JP)

( * ) Notice: Subject to any disclaimer, the term of this patent is extended or adjusted under 35 U.S.C. 154(b) by 1560 days.

(21) Appl. No.: 11/732,703

(22) Filed: Apr. 4, 2007

(65) Prior Publication Data
US 2007/0280629 A1 Dec. 6, 2007

(30) Foreign Application Priority Data

Apr. 10, 2006 (JP) ................ P2006-107292

(51) Int. Cl.
H04N 5/765 (2006.01)
H04N 5/931 (2006.01)
(52) U.S. Cl. ........................ 386/200; 386/204
(58) Field of Classification Search .............. None
See application file for complete search history.

(56) References Cited

U.S. PATENT DOCUMENTS 7,490,136 B2 * 2/2009 Suzuki .................. 709/217
2001/0013083 A1 8/2001 Nakamura
2002/0126986 A1 * 9/2002 Lim et al. .................. 386/52
2004/0221308 A1 * 11/2004 Cuttner et al. .............. 725/46
2007/0199039 A1 * 8/2007 Diroo et al. ............. 725/134

FOREIGN PATENT DOCUMENTS

JP 2001-229114 A 8/2001

* cited by examiner

Primary Examiner — William C Vaughn, Jr.
Assistant Examiner — Oluwaseun A Adegeye
(74) Attorney, Agent, or Firm — Lerner, David, Littenberg, Krumholz & Mentlik, LLP

(57) ABSTRACT

An electronic apparatus may include means for storing priority information on priorities of contents, means for receiving a list of the contents stored in another electronic apparatus with attribute information on contents in the list from anther electronic apparatus, means for determining whether a content in the list is a first content with a first priority or a second content with a second priority lower than the first priority, means for causing whole data of the first content to be received if the content is the first content and causing beginning portion data of the second content to be received if the content is the second content, means for storing at least one of the whole data and the beginning portion data, and means for causing the stored whole data to be reproduced and causing subsequent portion data to be received from the other electronic apparatus while the beginning portion data is being reproduced and to be reproduced following the reproduction of the beginning portion data.

12 Claims, 8 Drawing Sheets

ELECTRONIC APPARATUS, CONTENT REPRODUCING SYSTEM, CONTENT REPRODUCING METHOD, AND PROGRAM

CROSS-REFERENCE TO RELATED APPLICATIONS

This application claims priority from Japanese Patent Application No. JP 2006-107292 filed in the Japanese Patent Office on Apr. 10, 2006, the entire content of which is incorporated herein by reference.

BACKGROUND OF THE INVENTION

1. Field of the Invention

The present invention relates to an electronic apparatus capable of reproducing a content such as video and a reproducing method of the content.

2. Description of the Related Art

In recent years, a network system in which a plurality of electronic apparatuses such as a digital video recorder, a television, and a portable terminal are interconnected via a network such as a home network (home LAN (Local Area Network)) or the Internet and a content such as video can be reproduced in a plurality of places at home and outside the home using the respective apparatuses is proposed.

For example, an information processing device which acquires information on recording media mounted on each of a plurality of apparatuses connected via a network and controls the plurality of apparatuses based on the acquired information on the recording media so that the plurality of apparatuses can be used as one virtual apparatus is described (see Japanese Patent Application Laid-Open No. 2001-229114). In this information processing device, for example, if a reproduction request for one content is made from a user, an apparatus having the one content is allowed to perform reproduction processing. Further, it is also possible to dub a content recorded on a recording medium of one apparatus onto a recording medium of another apparatus.

SUMMARY OF THE INVENTION

However, in a technology described in the above patent document, it is possible that the information processing device centrally controls the respective apparatuses to allow contents prerecorded on respective recording media of the each of the apparatuses to be reproduced or allow dubbing (copy) of contents to be performed between the respective apparatuses. However, it may be impossible, for example, to allow a content not recorded on one apparatus but recorded scattered in the respective apparatuses to be reproduced in that apparatus by transferring the contents between the respective apparatuses without intervention of the information processing device.

Further, if a content is transferred between each of the plurality of apparatuses via the network and reproduced, it is necessary that the apparatuses to be constantly at standby state with their power being on, and it is difficult to reproduce a content stored in an apparatus which is not in the power-on state by another apparatus. Furthermore, in a state where a plurality of contents are transferred on the network, it is sometimes difficult to immediately reproduce a user's desired content because of insufficient throughput of the network, thereby impairing user friendliness.

Furthermore, if contents are shared among the respective apparatuses on the network, the limitation on the storage capacity of each apparatus becomes a problem.

In view of the above circumstances, it may be desirable to provide an electronic apparatus, a content reproducing system, a content reproducing method, and a program which allow a user's desired content out of contents existing on a network to be promptly reproduced while suppressing a storage capacity.

According to a principal aspect of the present invention, there is provided an electronic apparatus communicable with another electronic apparatus via a network. The electronic apparatus may include first storing means for storing priority information on priorities of contents capable of being used in the electronic apparatus, receiving means for receiving a list of contents stored in the other electronic apparatus with an attribute information indicating attribute of each of the contents in the list from the other electronic apparatus, determining means for determining whether a content in the list is a first content with a first priority or a second content with a second priority lower than the first priority based on the stored priority information, the received list and the received attribute information, a reception controlling means for causing a whole data of the first content to be received from the other electronic apparatus by the receiving means if the content in the list is determined to be the first content and for causing a beginning portion data, which is a predetermined portion from the beginning of the second content, to be received from the other electronic apparatus by the receiving means if the content in the list is determined to be the second content as a result of the determination, second storing means for storing at least one of the whole data and the beginning portion data, and a reproduction controlling means for causing the stored whole data to be reproduced and for causing a subsequent portion data, that is the data following the beginning portion, to be received from the other electronic apparatus by the receiving means while the stored beginning portion data is being reproduced and to be reproduced following the reproduction of the beginning portion data.

Here, the electronic apparatus may be a recording/reproduction device such as a HDD (Hard Disk Drive) recorder or a HDD/DVD (Digital Versatile Disk) recorder, a reproduction device such as a DVD player, a PC (Personal Computer) (which may be either a desktop or a notebook type), a television (including a portable television), a portable telephone, a PDA (Personal Digital Assistant), a game machine, or any other electric appliance. The content may be video data such as a television program, audio data such as music, text data such as a so-called electronic book, or the like.

The priority information may be usage trend information indicating attributes of contents which the user preferentially uses, and more specifically, for example, indicating the degree of preference, the degree of desire for use, and the estimated usage frequency of the user with respect to the contents. The attribute information may be, for example, information including categories and titles of programs, performers and keywords of the programs, and so on.

Further, the above beginning portion data may be data, for example, corresponding to one minute, several tens of seconds, or the like, but the time is not limited to these numerical values, and may be a time sufficient to make preparations for reproduction of the subsequent portion data. The subsequent portion data may be reproduced by streaming accompanied by buffering or by reproducing the received and stored data. Moreover, the above first storing means and second storing means may be formed as the same storing means.

Owing to the above constitution, for example, regarding the high-priority first content, by receiving the whole portion from the other electronic apparatus and storing it, reproduction can be immediately started independently of the other electronic apparatus. On the other hand, regarding the low-priority second content, by storing the beginning portion data, the storage capacity can be suppressed, and by receiving the subsequent portion data while reproducing the beginning portion data, and reproducing the subsequent portion data, reproduction of the second content can be also immediately started. Consequently, the second content can also be reproduced as if it were stored in this electronic apparatus from the very beginning without making the user aware that the subsequent portion data is received from the other electronic apparatus, thereby improving user friendliness. Incidentally, "performing such control that "reproduced" may be a concept including not only a case where the electronic apparatus includes a reproduction means such as a display or a speaker, but also a case where the electronic apparatus does not include the reproduction means itself and transmits a signal necessary for reproduction of a video signal, an audio signal, or the like to the reproduction means connected to the electronic apparatus.

In the above electronic apparatus, the first storing means may store reproduction history information on the first and the second contents reproduced by the reproduction controlling means, and the electronic apparatus may further include generating means for generating the priority information based on the reproduction history information.

Thus, the priority information can be created by learning the user's priorities for contents based on the above reproduction history information, so that the whole data and the beginning portion data can be automatically received without making the user aware of the priorities and without allowing the user to input the priority information, leading to an improvement in user friendliness.

In the above electronic apparatus, the first storing means may store the whole data and content titles in association with each other as a content list, and store the beginning portion data and the content titles in association with each other as a beginning list, and the determining means may receive an input of a user operation requesting reproduction of the content with the content title of the content and determine whether the inputted user operation is an operation requesting reproduction of either the first content or the second content based on the stored content list and beginning list, and the electronic apparatus may further include means for transmitting a transmission request signal requesting transmission of the subsequent portion data to the other electronic apparatus if the user operation is determined to be the operation requesting the reproduction of the second content as a result of the determination.

Hence, the whole data of the first contents and the beginning portion data of the second contents may be managed as lists, respectively, so that the user can treat the second content the same as the first content by promptly requesting the other electronic apparatus to transmit the subsequent portion data regarding the second content based on the user's reproduction request.

In the above electronic apparatus, the receiving means may receive notification information notifying that the content has been stored in the other electronic apparatus, and the electronic apparatus may further include means for transmitting a transmission request signal requesting transmission of the list and attribute information to the other electronic apparatus based on the received notification information.

Consequently, based on the above notification information, the whole data and beginning portion data can be received immediately after the other electronic apparatus stores the first or the second content, and promptly used by the user.

The above electronic apparatus may further include means for calculating an available storage capacity of the second storing means and means for transmitting a transmission request signal requesting transmission of the list and the attribute information to the other electronic apparatus if the available storage capacity increases.

Thus, the whole data and beginning portion data can be received according to the storage capacity of the second storing means, so that the available storage capacity can be used efficiently.

In the above electronic apparatus, the first storing means may store the priority information of a plurality of users, the receiving means may receive the whole data and the beginning portion data with respect to each of the users based on the priority information of each of the users, and the second storing means may store the whole data and the beginning portion data with respect to each of the users.

Hence, even if the electronic apparatus is shared among the plurality of users, the above whole data and the beginning portion data can be stored according to priorities of the respective users, and contents which varies from user to user can be promptly reproduced.

The above electronic apparatus may further include means for judging whether the other electronic apparatus is in a power-on state and means for transmitting a signal allowing the other electronic apparatus to be powered on to the other electronic apparatus if the other electronic apparatus is judged to be not in the power-on state.

Consequently, even if the other electronic apparatus is not in the power-on state, the whole data, beginning portion data, and the subsequent portion data can be received after the other electronic apparatus is brought into the power-on state, and a user's desired content can be promptly reproduced without waiting for activation processing of the other electronic apparatus.

A content reproducing system according to another aspect of the present invention is a system which may include a first electronic apparatus and a second electronic apparatus which are communicable via a network, wherein the first electronic apparatus may include first storing means for storing priority information on priorities of contents capable of being used in the first electronic apparatus, receiving means for receiving a list of the contents stored in the second electronic apparatus with an attribute information indicating attribute of each of the contents in the list from the second electronic apparatus, determining means for determining whether a content in the list is a first content with a first priority or a second content with a second priority lower than the first priority based on the stored priority information, the received list and the received attribute information, transmitting means for transmitting a first transmission request signal requesting transmission of whole data of the first content to the second electronic apparatus if the content in the list is determined to be the first content as a result of the determination, and transmitting a second transmission request signal requesting transmission of a beginning portion data, which is a predetermined portion from the beginning of the second content, to the second electronic apparatus if the content in the list is determined to be the second content as the result of the determination, reception controlling means for causing the whole data and the beginning portion data to be received from the second electronic apparatus by the receiving means, second storing means for storing the received whole data and the beginning portion data, and reproduction controlling means for causing the stored whole data to be reproduced and for causing a third transmission request signal requesting transmission of a subsequent portion data following the beginning portion data to be transmitted to the second electronic apparatus by the transmitting means and for causing the subsequent portion data to be received by the receiving means while the beginning portion data is being reproduced and to be reproduced following the reproduction of the beginning portion data. The second electronic apparatus may include storing means for storing the contents with the list and the attribute information, transmitting means for transmitting the stored list and attribute information to the first electronic apparatus, receiving means for receiving the first, the second, and the third transmission request signals, and transmission controlling means for causing the whole data to be transmitted to the first electronic apparatus by the transmitting means based on the received first, the second, and the third transmission request signals, for causing the beginning portion data to be generated from the content and to be transmitted to the first electronic apparatus by the transmitting means, and for causing the subsequent portion data to be generated from the content and transmitted to the first electronic apparatus by the transmitting means.

Thus, contents stored in the first electronic apparatus can be optimized by placing the whole data and the beginning portion data from the second electronic apparatus to the first electronic apparatus based on the user's priority information of the first electronic apparatus, and the first content originally exiting in the second electronic apparatus can be promptly reproduced in the first electronic apparatus. Further, regarding the second content, by allowing the first electronic apparatus to store only the beginning portion data, the storage capacity of the first electronic apparatus can be suppressed. Furthermore, the second electronic apparatus may transmit the subsequent portion data in response to the request of the first electronic apparatus, which makes it possible to promptly reproduce the second content without making the user aware of which electronic apparatus stores the second content.

A content reproducing method according to still another aspect of the present invention is a content reproducing method by which an electronic apparatus communicable with another electronic apparatus via a network reproduces a content. The content reproducing method may include storing priority information on priorities of contents capable of being used in the electronic apparatus, receiving a list of the contents stored in the other electronic apparatus with an attribute information indicating attribute of each of the contents in the list from the other electronic apparatus, determining whether a content in the list is a first content with a first priority or a second content with a second priority lower than the first priority based on the stored priority information, the received list and the received attribute information, receiving whole data of the first content from the other electronic apparatus if the content in the list is determined to be the first content as a result of the determination, and receiving a beginning portion data, which is a predetermined portion from a beginning of the second content, from the other electronic apparatus if the content in the list is determined to be the second content as the result of the determination, storing at least one of the received whole data and the beginning portion data and causing the stored whole data to be reproduced and causing the subsequent portion data following the beginning portion data to be received from the other electronic apparatus while the stored beginning portion data is being reproduced and reproduced following the reproduction of the beginning portion data.

A program that causes an electronic apparatus to function as an apparatus communicable with another electronic apparatus via a network according to yet another aspect of the present invention may include storing priority information on priorities of contents capable of being used in the electronic apparatus, receiving a list of the contents stored in the other electronic apparatus with an attribute information indicating attribute of each of the contents in the list from the other electronic apparatus, determining whether a content in the list is a first content with a first priority or a second content with a second priority lower than the first priority based on the stored priority information, the received list and the received attribute information, receiving whole data of the first content from the other electronic apparatus if the content in the list is determined to be the first content as a result of the determination, and receiving a beginning portion data, which is a predetermined portion from a beginning of the second content, from the other electronic apparatus if it is determined that the content in the list is the second content as the result of the determination, storing at least one of the received whole data and the beginning portion data, and causing the stored whole data to be reproduced and causing the subsequent portion data following the beginning portion data to be received from the other electronic apparatus while the stored beginning portion data is being reproduced and to be reproduced following the reproduction of the beginning portion data.

As described above, according to the aspects of the present invention, a user's desired content can be promptly reproduced from contents existing on the network while the storage capacity is suppressed.

DETAILED DESCRIPTION

Next, with reference to the accompanying drawings, an embodiment of the present invention will be described.

Figure 1:
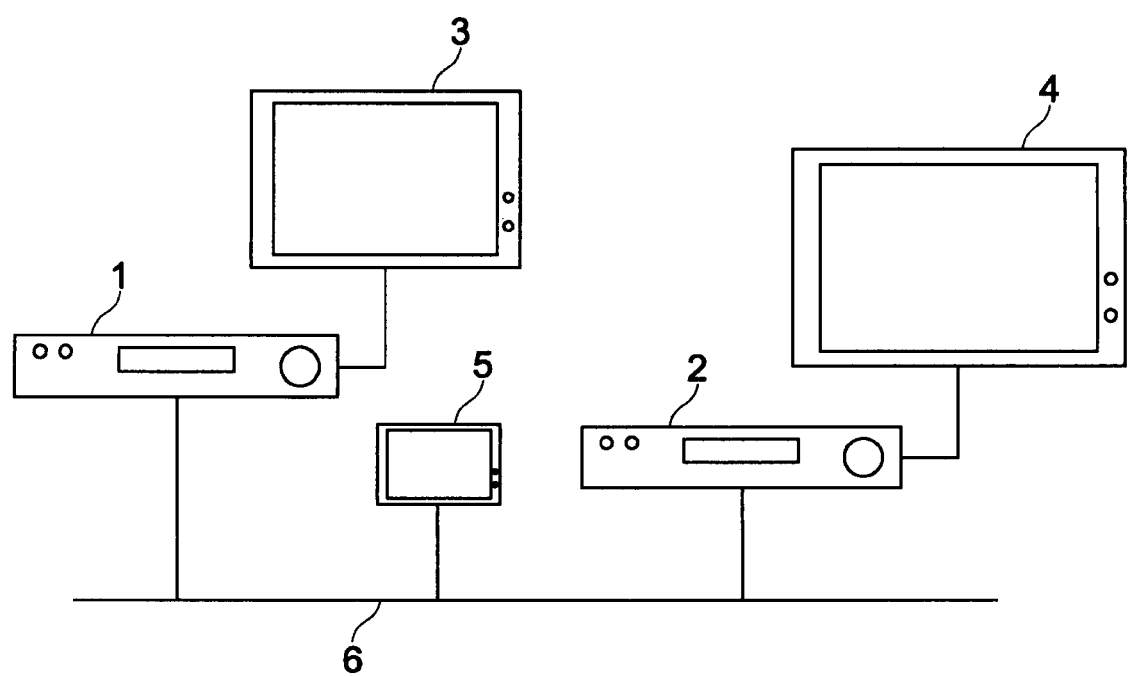
FIG. 1 is a diagram showing a schematic configuration of a content reproducing system according to an embodiment of the present invention.

FIG. 1 is a diagram showing a schematic configuration of a content reproducing system according to an embodiment of the present invention. As shown in this diagram, this system includes a digital video recorder 1 (hereinafter referred to as a DVR 1), a digital video recorder 2 (hereinafter referred to as a DVR 2), and a portable television 5 (hereinafter referred to as a portable TV 5). The DVR 1, the DVR 2, and the portable TV 5 are connected to a network 6 (so-called home LAN)

such as Ethernet or a wireless LAN (Local Area Network) and can communicate with each other. In particular, in this embodiment, contents can be mutually exchanged (copied or moved) between the respective apparatuses via the network 6. Further, the DVR 1 and the DVR 2 are connected to a digital television 3 (hereinafter referred to as a digital TV 3) and a digital television 4 (hereinafter referred to as a digital TV 4), respectively, by dedicated lines. Each digital TV has a display and a speaker (not shown) and can output a video signal and an audio signal transmitted from each DVR.

Figure 2:
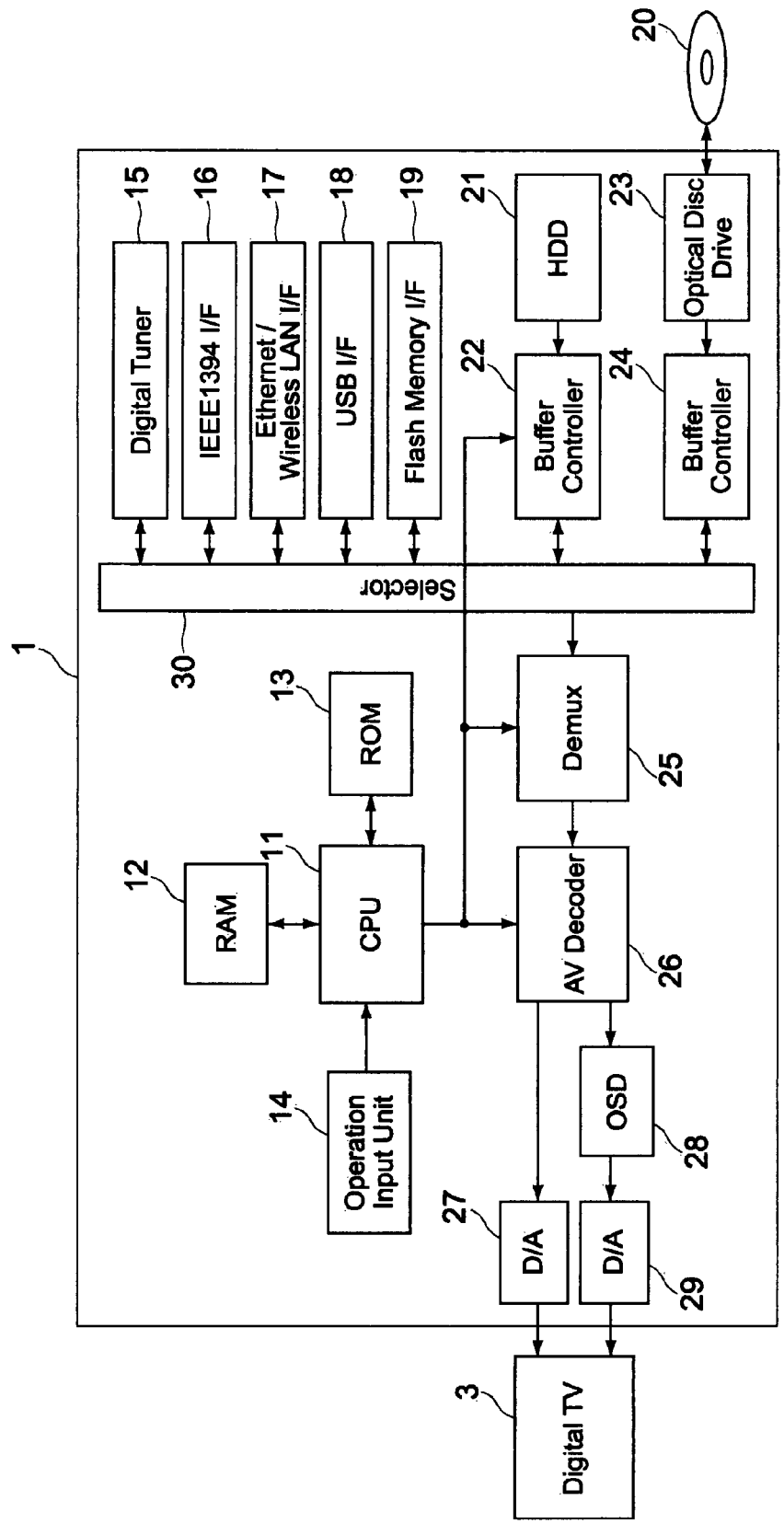
FIG. 2 is a block diagram showing a configuration of a DVR 1 in FIG. 1.

FIG. 2 is a block diagram showing a configuration of the above DVR 1. As shown in this figure, the DVR 1 includes a CPU (Central Processing Unit) 11, a RAM (Random Access Memory) 12, a ROM (Read Only Memory) 13, an operation input unit 14, a digital tuner 15, an IEEE1394 interface (I/F) 16, an Ethernet/wireless LAN interface (I/F) 17, a USB (Universal Serial Bus) interface 18, a flash memory interface 19, a HDD (Hard Disk Drive) 21, buffer controllers 22 and 24, an optical disc drive, 23, a demultiplexer 25, an AV (Audio Visual) decoder 26, an OSD (On-Screen Display) 28, D/A (Digital/Analog) converters 27 and 29, and a selector 30.

The CPU 11 timely accesses the RAM 12 or the like if necessary and centrally controls all of respective blocks of the DVR 1. The RAM 12 is a memory which is used as a working area of the CPU 11 or the like and temporarily holds an OS, programs, processing data, and so on. Further, the RAM 12 is also used as a buffering area of data for streaming reproduction received via the network 6. The ROM 13 is a nonvolatile memory in which the OS, programs, and firmware including various parameters to be executed by the CPU 11 are fixedly stored.

The operation input unit 14 includes a button, a switch, a key, an indicator for operation confirmation, a light receiving part of an infrared signal transmitted from a remote controller (not shown), and so on, and receives inputs of various set values and commands given by the operation of a user and outputs them to the CPU 11.

In accordance with the control of the CPU 11, the digital tuner 15 selects a specific channel of digital broadcasting to receive broadcast data via an antenna not shown and demodulates the broadcast data, and the demodulated broadcast data is outputted for reproduction to the demultiplexer 25 via the selector 30, recorded on the HDD 21 via the buffer controller 22, or recorded on an optical disc 20 being inserted into the optical disc drive 23 via the buffer controller 24. The broadcast data is, for example, an MPEG stream compressed by an MPEG (Motion Picture Expert Group) format, or the like.

The IEEE1394 interface 16 is connectable to an external apparatus such as a digital video camera. For example, content data such as moving image data taken and recorded by the digital video camera can be reproduced or recorded on the HDD 21 or the optical disc 20 in the same manner as moving image data received by the above digital tuner 15.

The Ethernet/wireless LAN interface 17 receives inputs of content data such as moving image data and other data recorded on the above DVR 2, portable TV 5, and so on via the above network 6 such as Ethernet or the wireless LAN. This content data also can be reproduced and recorded on the HDD 21 and the optical disc 20.

The USB interface 18 receives inputs of content data and other data, for example, from an external storage device such as a USB memory and an apparatus such as a digital camera via a USB. These data also can be reproduced and recorded on the HDD 21 and the optical disc 20.

The flash memory interface 19 connects with, for example, a memory card with a built-in flash memory (for example, a memory card) and receives inputs of content data and other data recorded on this flash memory. These data also can be reproduced and recorded on the HDD 21 and the optical disc 20.

The selector 30 selects data inputted from any of the above respective interfaces, the HDD 21, and the optical disc 20 based on a control signal from the CPU 11.

The HDD 21 records content data such as moving image data, various programs, and other data on a built-in hard disk and reads them from this hard disk during reproduction or the like. The above moving image data is compressed, for example, by the MPEG format and recorded, but the format is not limited to this format.

The buffer controller 22 controls the timing of writing into the HDD 21 and data amount of data continuously supplied via the above digital tuner 14, Ethernet/wireless LAN interface 17, or the like and intermittently writes the data into the HDD 21. Further, the buffer controller 22 controls the timing of reading and data amount of data recorded on the HDD 21 and continuously supplies data such as an MPEG stream that is intermittently read from the HDD 21 to the demultiplexer 25.

Furthermore, the buffer controller 22 buffers not only data read from and written into the HDD 21 but also, for example, stream data inputted for streaming reuse from the above Ethernet/wireless LAN interface 17, and controls timing of supplying the stream data to the demultiplexer 25.

The optical disc drive 23, on which the optical disc 20 can be mounted, can record and reproduce a signal to the optical disc 20. The optical disc drive 23, for example, reads data such as the moving image data and inputs it to the buffer controller 24. The optical disc 20 is, for example, a DVD disk (DVD-Video, DVD-RAM, DVD-R, DVD-RW, DVD+R, DVD+RW, or the like), a Blu-ray Disc (registered trademark), or the like.

Similarly to the above buffer controller 22, the buffer controller 24 controls the timing of reading and data amount of data continuously inputted from the optical disc drive 23 and continuously outputs data such as an MPEG stream intermittently read from the optical disc drive 23 to the demultiplexer 25.

The demultiplexer 25 demultiplexes the multiplexed MPEG stream inputted from each of the above buffer controllers 22 and 24 into an MPEG audio stream and an MPEG video stream and outputs them to the AV decoder 26.

The AV decoder 26 performs decoding processing on the above demultiplexed MPEG audio stream and MPEG video stream, respectively, to convert them into a digital audio signal and a digital video signal, and outputs the digital audio signal to the D/A converter 27 and the digital video signal to the OSD 28.

The D/A converter 27 converts the digital audio signal inputted from the above AV decoder 26 into an analog audio signal and outputs it for reproduction to the speaker of the digital TV 3, for example, via the dedicated line.

The OSD 28 generates graphics or the like to be displayed on the display of the digital TV 3, performs processing of combining/switching with the above digital video signal, and outputs video data after the processing to the D/A converter 29.

The D/A converter 29 converts the digital video signal subjected to the graphics processing in the OSD 28 into an analog video signal (NTSC (National Television Standards Committee) signal) and outputs it for display to the display of the digital TV 3, for example, via the dedicated line.

Further, in the broadcast data of the above digital broadcasting, in addition to the audio stream and the video stream, a data broadcast signal, a PSI/SI (Program Specific Information/Service Information) signal to transmit EPG (Electronic Program Guide) data or the like, and the like are included. In the above RAM 12 or HDD 21, the EPG data extracted from the PSI/SI signal or the like is also stored.

Incidentally, the DVR 2 has the same configuration as the above DVR 1 and can output an audio signal and a video signal to the display and the speaker of the digital TV 4. Further, the portable TV 5 has basically almost the same configuration as the above DVR 1 and DVR 2 in addition to a display and a speaker and can exchange data such as an MPEG stream with the DVR 1 and the DVR 2 via the network 6 and reproduce the data. Incidentally, unlike the DVRs 1 and 2, the portable TV 5 may not include an HDD, and may store content data and other data in a semiconductor memory such as a flash memory.

Figure 3:
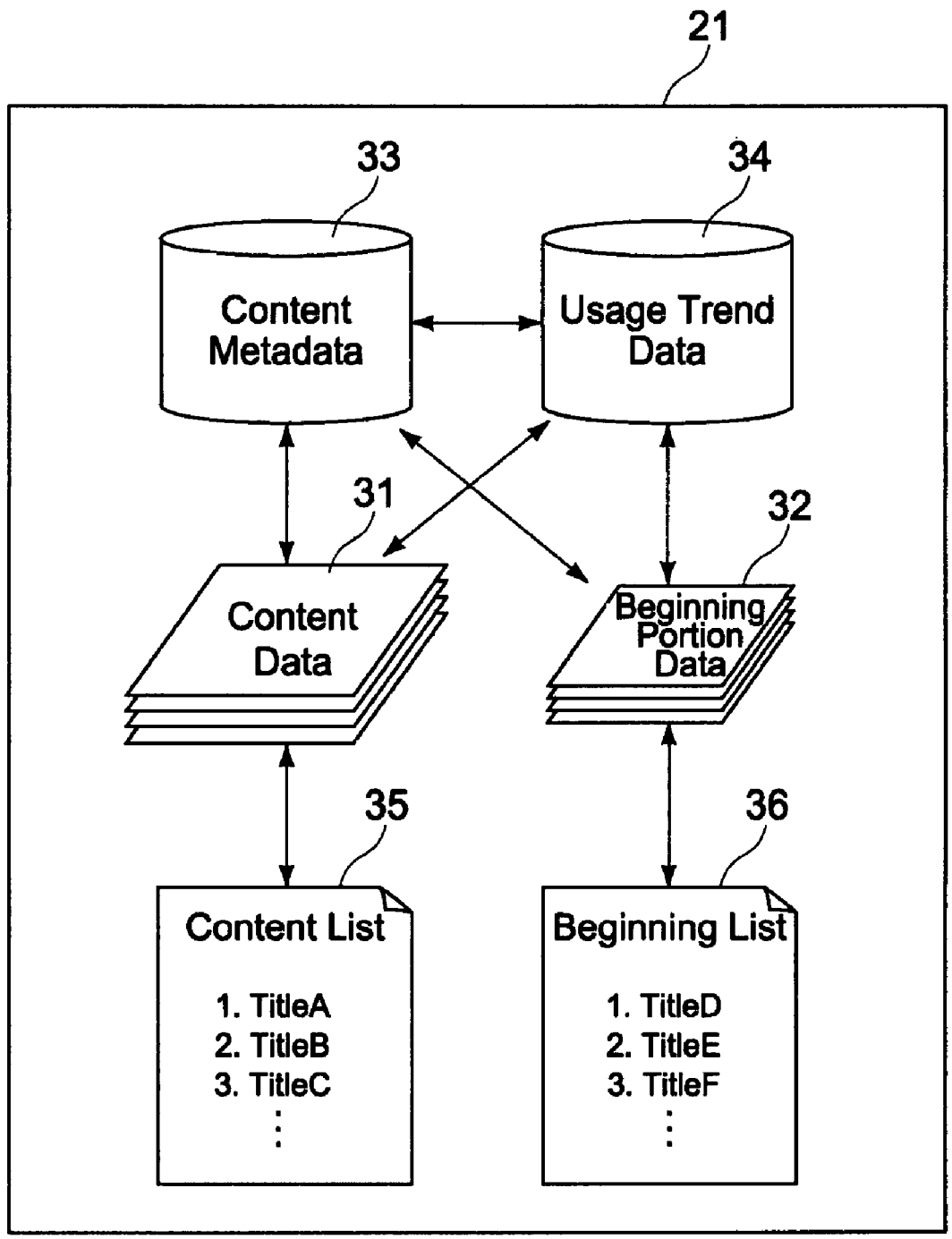
FIG. 3 is a diagram showing an example of data stored in a HDD 21 of the DVR 1 according to an embodiment of the present invention.

Next, data stored in the DVR 1 will be described. FIG. 3 is a diagram showing an example of the data stored in the HDD 21 of the DVR 1.

As shown in this figure, in the HDD 21, content data 31 such as an MPEG stream received by the digital tuner 15 and also received from the DVR 2 and the portable TV 5 via the network 6 and beginning portion data 32 are stored. The content data 31 is stored by storing, for example, with respect to each broadcast program title, the whole data from the beginning to the end of the title, and in some cases, it is received by its own digital tuner 15 and recorded, while in other cases, it is received from the DVR 2 or the portable TV 5 via the network 6 and recorded as will be described later. On the other hand, the beginning portion data 32 is data obtained by extracting a predetermined portion from the beginning of a title of a content, and received from the above DVR 2 or portable TV 5 and stored as will be described later. The predetermined portion is, for example, several tens of seconds to one minute, but not limited to this range, and determined appropriately according to a congestion state of the network 6 as will be described later.

Further, in the HDD 21, usage trend data 34 in which the usage trends of respective content data 31 of the user of the DVR 1 are described is stored. The usage trend data 34 is data indicating the result of analyzing the user's preference for each content and describing the usage frequency (priority) of each content. In the usage trend data 34, for example, by recording the numbers of times of reproduction of respective titles of the content data 31 recorded and reproduced in the DVR 1 or contents subjected to streaming reproduction described later as histories and referring to categories of the respective titles with reference to content metadata 33 to judge which category of contents the user uses most frequently in the DVR 1, the category of contents with the highest usage frequency is set as a category of contents to be received from another apparatus and stored. Namely, if categories of contents are classified, for example, as news, movies/dramas, animations, and sports, setting, for example, whether the DVR 1 is a DVR for watching news or a DVR for watching movies/dramas is performed based on the usage trend data 34. Moreover, it is, of course, possible to set a plurality of categories with high usage frequencies in order of usage frequency. For example, a category with the highest usage frequency is set as a first set category, and a category with the second highest usage frequency is set as a second set category. Incidentally, it is, of course, possible to set a plurality of categories in each of the first set category and the second set category.

Further, in the HDD 21, the content metadata 33 as attribute information on the content data 31, for example, extracted from the above EPG data is also stored. In the content metadata 33, for example, data such as the title, broadcast date, day of the week, broadcast start time and broadcast end time, station name, category, and headline (program summary information) of a program is included. The content meta data 33 is referred to by the CPU 11 at the time of exchange of contents between respective apparatuses described later and exchanged between the DVR 1 and the DVR 2 and the portable TV 5 via the network 6.

Furthermore, in the HDD 21, a content list 35 and a beginning list 36 in which lists of the above content data 31 and beginning portion data 32 are respectively described are stored. In each of the content list 35 and beginning list 36, for example, a list of titles of respective contents is described, and similarly to the above content meta data 33, referred to by the CPU 11 at the time of exchange of the content data 31 described later and exchanged between the DVR 1 and the DVR 2 and the portable TV 5 via the network 6

Incidentally, although not shown, data similar to those stored in the above HDD 21 are also stored in each of an HDD of the DVR 2 and an HDD or a flash memory of the portable TV 5 and can be referred to by a CPU of each apparatus.

Next, operations of the DVR 1, the DVR 2, and the portable TV 5 in the system thus configured will be described.

Figure 4:
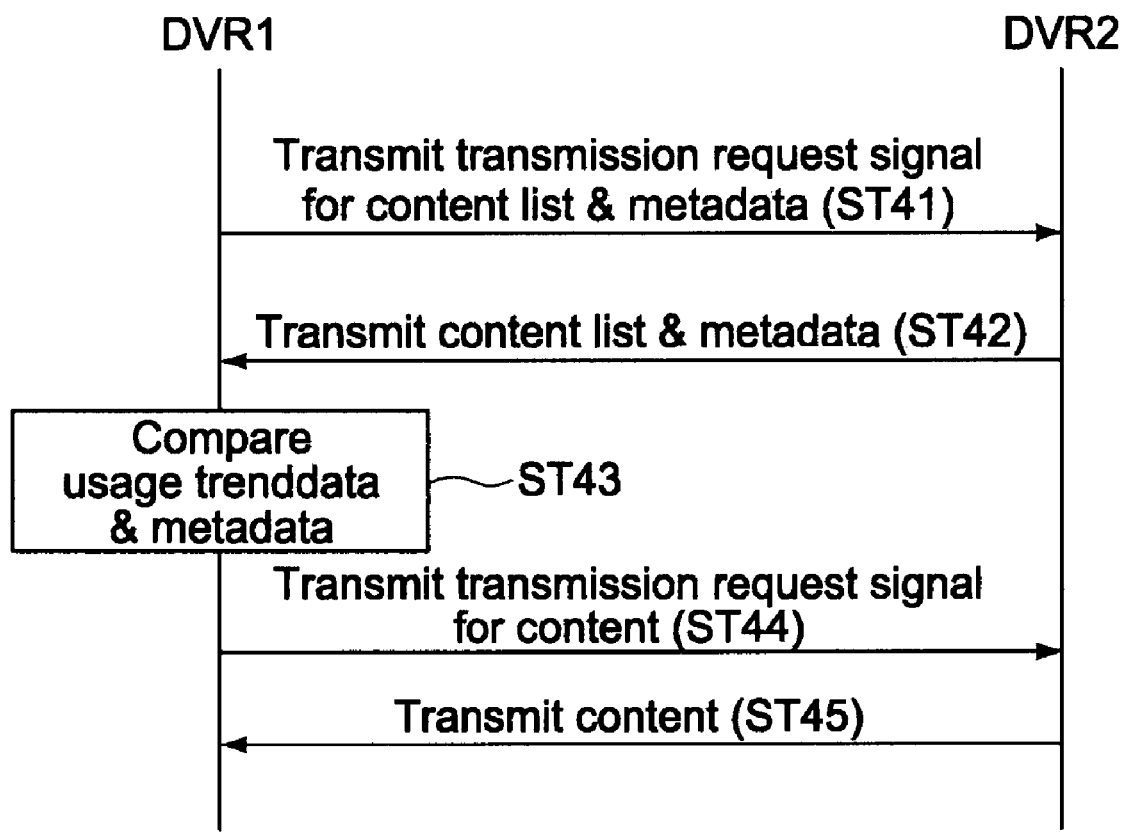
FIG. 4 is a sequence diagram showing data exchange between the DVR 1 and a DVR 2 according to an embodiment of the present invention.

FIG. 4 is a sequence diagram showing data exchange between the DVR 1 and the DVR 2. Incidentally, in this figure, it is assumed that in the usage trend data 34 of the DVR 1, the movie/drama category is set as the first set category, and the animation category is set as the second set category. It is also assumed that respective digital tuners of the DVR 1 and the DVR 2 arbitrarily receive content data regardless of the above usage trend data and record them to respective HDDs.

As shown in this figure, when a content recorded on the DVR 2 is transferred to the DVR 1, first, the CPU 11 of the DVR 1 transmits a transmission request signal requesting transmission of the content list stored in the HDD of the DVR 2 with the content metadata on respective contents to the DVR 2 by the Ethernet/wireless LAN interface 17 (step 41). The timing of transmitting this transmission request signal is thought to be, for example, when the CPU 11 monitors the available storage capacity of the HDD 21 and judges that an available storage capacity sufficient to newly store the content data 31 has appeared. Besides this method, for example, the transmission request signal may be transmitted regularly (for example, at intervals of a predetermined period such as one day), or may be transmitted by the operation input of the user.

Then, when receiving the transmission request signal via the Ethernet/wireless LAN interface, in response to this transmission request, the CPU of the DVR 2 transmits the content list and the content metadata stored in its own HDD to the DVR 1 (step 42).

When receiving the content list and the content metadata, the CPU 11 of the DVR 1 compares these content list and content metadata with the above usage trend data 34 stored on its own HDD 21 and judges whether any content which is not stored in the HDD 21 in the DVR 1 and belongs to the first set category exists on the DVR 2 side (step 43). If judging that a desired content exists on the DVR 2 side, the CPU 11 transmits a transmission request signal requesting transmission of this content, together with the title of this content, to the DVR 2 (step 44).

When receiving the transmission request signal for this content, in response to this transmission request, the CPU of the DVR 2 retrieves content data of the title as an object of the transmission request (the whole data of the title) from its own HDD and transmits it to the DVR 1 (step 45). The DVR 1 stores the received content data in the HDD 21. Incidentally, this content data may be copied from the DVR 2 to the DVR 1 or may be transferred (so-called moved) to the DVR 1 after erased from the DVR 2 side.

By the above operation, the content of the movie/drama category with the highest usage frequency on the DVR 1 side is transferred from the DVR 2 side. Then, when judging that a content of the animation category as the second set category exists in the above content list received from the DVR 2, the CPU 11 requests transmission of the above beginning portion data 32 obtained by extracting only a beginning portion instead of requesting transmission of the whole data on the title of the content. In response to the transmission request for the beginning portion data, the CPU of the DVR 2 generates beginning portion data based on the content data and transmits it to the DVR 1. The DVR 1 stores the received beginning portion data in the HDD 21. When in the DVR 1, a reproduction request is made from the user regarding the title of the animation category whose beginning portion data is stored, the CPU 11 reproduces this beginning portion data 32 in the digital TV 3 by the demultiplexer 25, the AV decoder 26, and so on and transmits a transmission request signal requesting transmission of subsequent portion data following the beginning portion data to the DVR 2, and in response to this transmission request, the CPU of the DVR 2 generates the subsequent portion data based on the content data and transmits it to the DVR 1. The DVR 1 performs, for example, streaming reproduction on the subsequent portion data.

The above operation is performed similarly also when a content is transmitted from the DVR 1 to the DVR 2, and further the DVR 1 transmits the above transmission request for the content list to all apparatuses including the portable TV 5 connected to the network 6. Furthermore, the portable TV 5 and the DVR 2 each similarly transmit the transmission request for the content list to other apparatuses and acquire content data and beginning portion data.

This makes it possible for the DVR 1 to store the content with the highest usage frequency as the content data 31 previously from the DVR 2 to the HDD 21 to respond immediately to the reproduction request of the user and also regarding the content with the second highest usage frequency, store only the beginning portion as the beginning portion data 32 to reduce the storage capacity of the HDD 21 and, if the reproduction request for the title corresponding to the beginning portion data 32 is made from the user, receive and reproduce remaining portion data while reproducing the beginning portion data 32, thereby immediately starting reproduction in response to the reproduction request of the user as if the content were stored from the very beginning without giving a waiting time to the user due to buffering.

The above reception of the beginning portion data 32 is particularly effective in the portable TV 5 whose HDD, flash memory, and so on have more limited storage capacities and which is more often used outdoors compared to the DVR. Hereinafter, the operation of the portable TV 5 will be described in detail.

Figure 5:
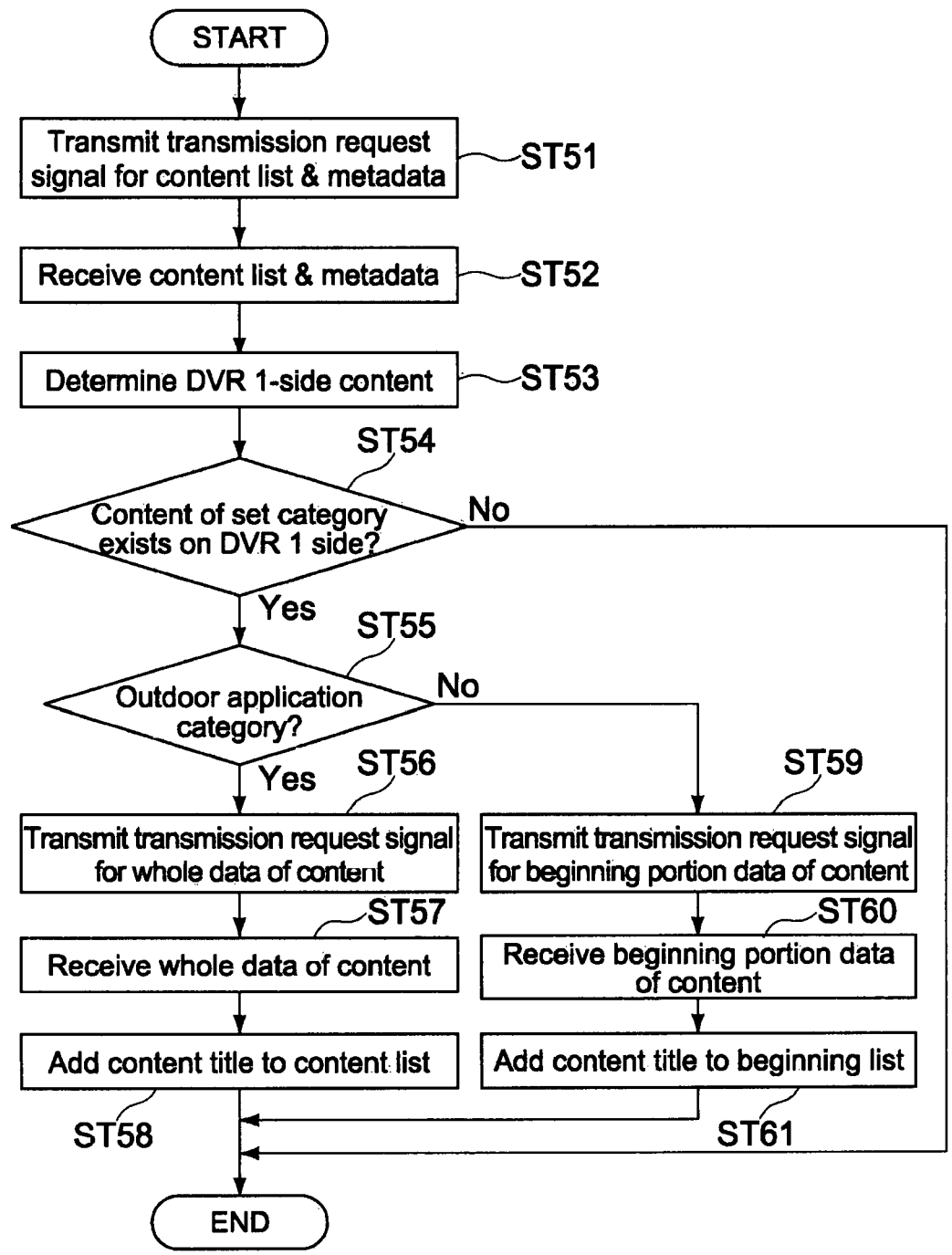
FIG. 5 is a flow chart showing a flow of an operation if a portable TV 5 receives a content from the DVR 1 and reproduces it according to an embodiment of the present invention.

FIG. 5 is a flow chart showing a flow of an operation when the portable TV 5 receives a content from the DVR 1 and reproduces it. Incidentally, since the portable TV 5 is often used outdoors, in the portable TV 5, a plurality of categories are set in usage trend data, and these set categories are classified into outdoor application categories and indoor application categories. The outdoor application category is, for example, the news category, and the indoor application category is, for example, the movie/drama category, or the animation category.

As shown in this figure, first, the CPU of the portable TV 5 transmits a transmission request signal for a content list and content metadata to the DVR 1 via the Ethernet/wireless LAN interface (step 51), and receives the corresponding content list and content metadata from the DVR 1 which has responded to the transmission request signal (step 52). Then, the CPU of the portable TV 5 compares the received content list and metadata and usage trend data stored in itself, and also refers to its own content list to determine whether a content which is not stored in the portable TV 5 and belongs to a set category exists on the DVR 1 side (step 54).

If the content of the set category exists on the DVR 1 side as a result of the determination (Yes in step 54), the CPU of the portable TV 5 further refers to the usage trend data to determine whether this content belongs to the indoor application category or the outdoor application category (step 55). If the above content belongs to the outdoor application category as a result of the determination (Yes in step 55), the CPU of the portable TV 5 transmits a transmission request signal requesting transmission of whole data of the content to the DVR 1 via the Ethernet/wireless LAN interface (step 56), receives the whole data from the DVR 1 (step 57), stores it in the HDD or the flash memory, also adds a content title of the content to the content list stored in the HDD or the flash memory, and then performs an update (step 58).

On the other hand, if the above content belongs to the indoor application category as the result of the determination (No in step 55), the CPU of the portable TV 5 transmits a transmission request signal requesting transmission of beginning portion data of the content to the DVR 1 (step 59), receives the beginning portion data (step 60), stores it in the HDD or the flash memory, also adds a content title of the content to a beginning list stored in the HDD or the flash memory, and then performs an update (step 61).

By the above operation, in the portable TV 5, the whole data of the content of the outdoor application category and the beginning portion data of the indoor application category are respectively received from the DVR 1 and stored. The portable TV 5 performs the same processing as above with respect to the DVR 2, and stores the whole data and beginning portion data of contents.

Figure 6:
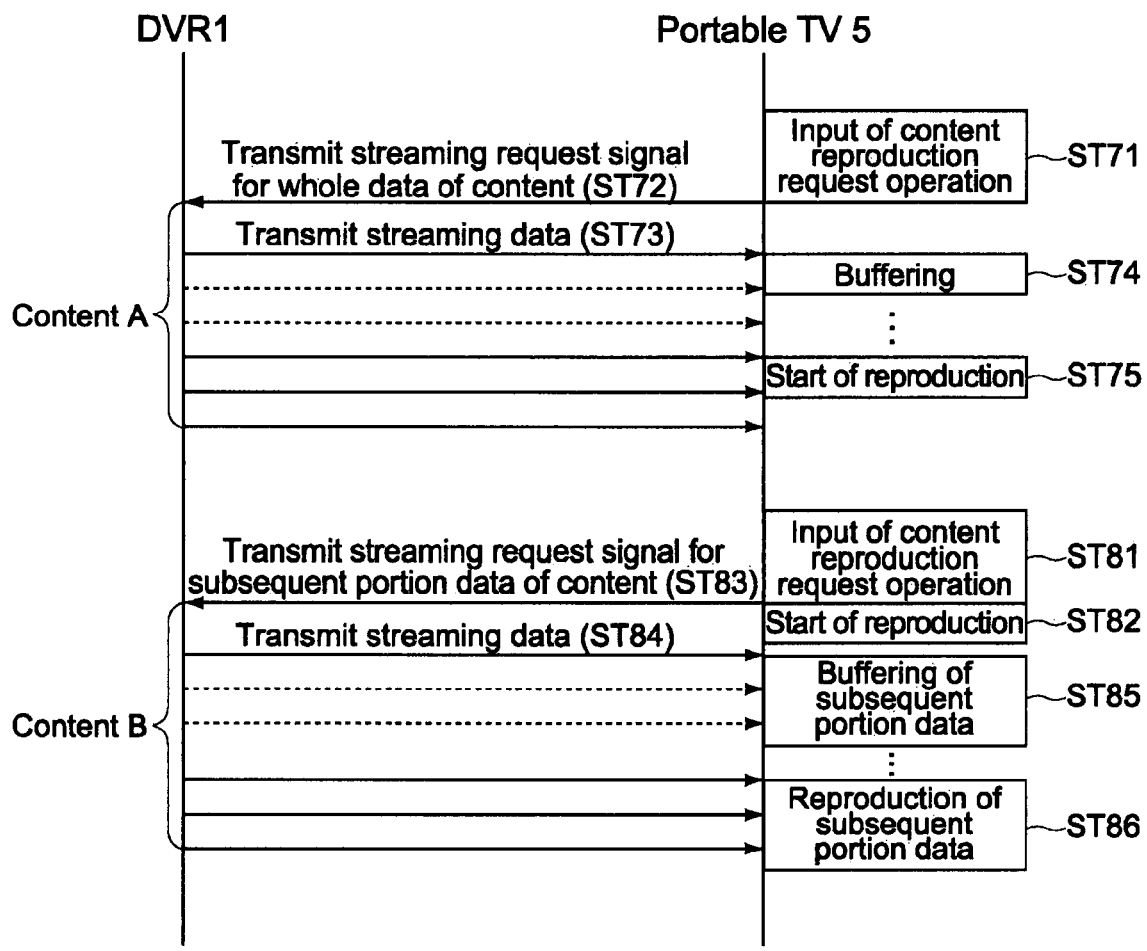
FIG. 6 is a sequence diagram showing data exchange between the portable TV 5 and the DVR 1 if the portable TV 5 reproduces beginning portion data according to an embodiment of the present invention.
Figure 7:
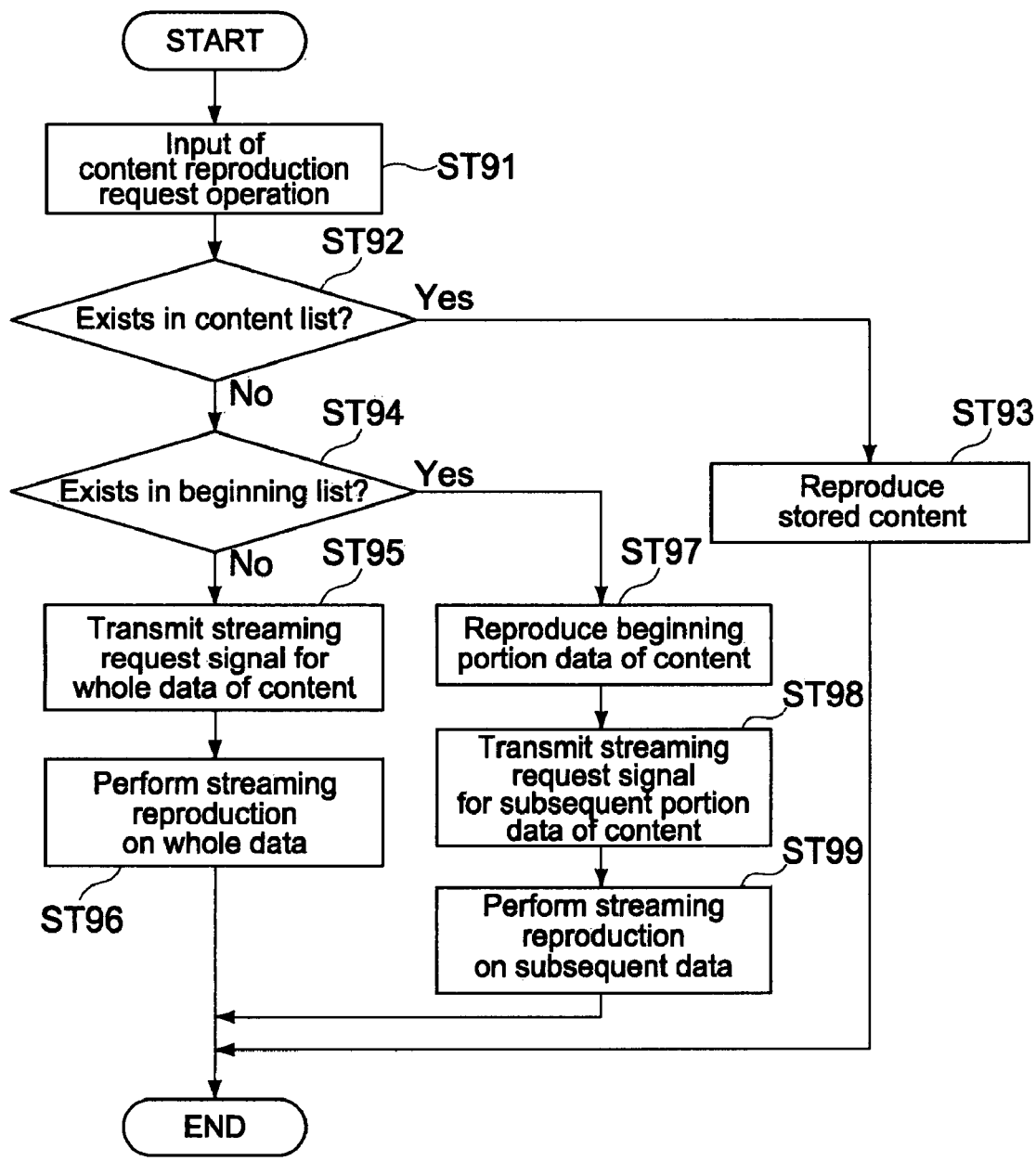
FIG. 7 is a flow chart showing a flow of an operation if the portable TV 5 reproduces the beginning portion data according to an embodiment of the present invention.

Next, an operation when the above beginning portion data is reproduced in the portable TV 5 will be described. FIG. 6 is a sequence diagram showing data exchange between the portable TV 5 and the DVR 1 in this operation, and FIG. 7 is a flow chart showing a flow of this operation. Incidentally, in FIG. 6, processes when a content A which exists neither in the content list nor in the beginning list within the portable TV 5 and a content B which exists in the beginning list are reproduced, respectively, are compared and shown.

As shown in FIG. 7, first, the CPU of the portable TV 5 receives an input of a content reproduction request operation from the user via an operation input unit (step 91). This input is performed, for example, by allowing a display unit of the portable TV 5 to display a GUI (Graphical User Interface) such as an icon to select one content from contents existing in the network and reproduces the one content and then by the user pressing the icon.

Subsequently, the CPU of the portable TV 5 judges whether or not the title of the content as the object of this reproduction request exists in its own content list (step 92), and when judging that it exists in the content list (Yes in step 92), the CPU allows this content to be reproduced from the display and the speaker via a demultiplexer, an AV decoder, a D/A converter, and so on (step 93).

Further, when judging that the content as the object of the above reproduction request does not exist in the content list, the CPU of the portable TV 5 further judges whether the title of this content exists in the beginning list (step 94), and if it does not exist in the beginning list (No in step 94), the CPU of the portable TV 5 receives and analyzes the content lists from the DVR 1 and the DVR 2, respectively, thereafter transmits a streaming request signal for the whole data of the content to either the DVR 1 or the DVR 2 where the content exists (step 95), and performs streaming reproduction on the whole data (step 96).

For example, as shown in steps 71 to 75 in FIG. 6, if the content A exists in the DVR 1, following the input of the content reproduction request operation, the CPU of the portable TV 5 transmits the streaming request signal to the DVR 1 and receives and reproduces streaming data. In this streaming reproduction, a time for buffering is necessary between the reception of the streaming data from the DVR 1 and the start of reproduction, so that it is difficult to immediately start reproduction in response to the reproduction request of the user.

On the other hand, when judging that the content as the object of the above reproduction request exists in the beginning list (Yes in step 94), the CPU of the portable TV 5 reproduces beginning portion data of this content (step 97), also transmits a streaming request signal for subsequent portion data following this beginning portion data to the DVR 1 or the DVR 2 from which the beginning portion data has been received (step 98), and performs streaming reproduction on the received subsequent portion data, following the reproduction of the beginning portion data (step 99).

For example, as shown in steps 81 to 86 in FIG. 6, when receiving beginning portion data of the content B from the DVR 1, the CPU of the portable TV 5 transmits a streaming reproduction request signal for subsequent portion data to this DVR 1, receives the corresponding streaming data, and reproduces it following the reproduction of the beginning portion data. In this case, compared to the above case where the content A is reproduced, since the portable TV 5 has the beginning portion data, not only the available storage capacity of the HDD or the flash memory can be increased during non-reproduction hours, but also reproduction of the content B can be immediately started in response to the reproduction request of the user, and the above subsequent portion data is buffered during the reproduction of the beginning portion data and reproduced subsequent to the beginning portion data, so that the content B can be reproduced as if it were stored in the portable TV 5 from the very beginning without giving the user a waiting time and making the user aware that the subsequent portion data is received via the network 6.

Figure 8:
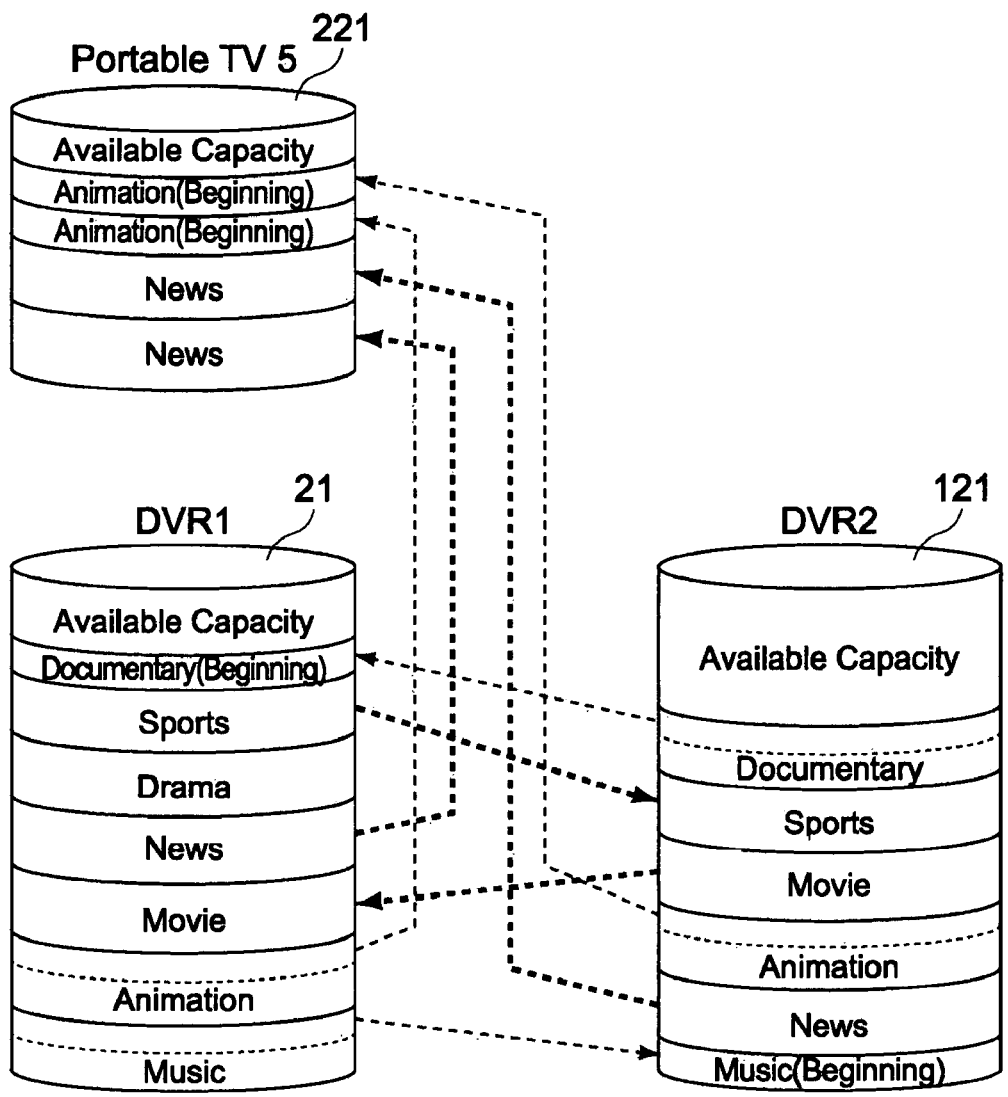
FIG. 8 is a diagram showing usage statuses of storage areas of respective apparatuses if contents are placed in the storage areas according to an embodiment of the present invention.

FIG. 8 is a diagram showing usage statuses of storage areas of the respective apparatuses when contents are placed in the storage areas by the operations of the respective apparatuses described above. In this figure, in the DVR 1, movies/dramas are set as the first set category and documentaries are set as the second set category, in the DVR 2, sports are set as the first set category, music is set as the second category, and in the portable TV 5, news are set as the outdoor application category, and animations are set as the indoor application category. In this case, the whole data of contents of the movie category and beginning portion data of contents of the documentary category are moved from the DVR 2 to the HDD 21 of the DVR 1, the whole data of contents of the sport category and beginning portion data of contents of the music category are moved from the DVR 1 to the DVR 2, and the whole data of contents of the news categories and beginning portion data of contents of the animation categories are moved from the DVR 1 and the DVR 2, respectively, to the portable TV 5. As just described, according to this embodiment, it is possible to place optimum contents in the respective apparatuses and perform reproduction promptly in response to the reproduction request of the user while suppressing the storage capacities of the respective apparatuses connected to the network 6.

It is, of course, to be understood that the present invention is not intended to be limited only to the above embodiment and various changes may be made therein without departing from the spirit of the present invention.

In the above embodiment, the description is given on the assumption that the number of users of each apparatus such as the DVR 1 on the network 6 is one, but when there are a plurality of users of each apparatus, it is also possible to divide the storage area of the above HDD for respective users, store the data shown in FIG. 3 with respect to each of the users, and acquire whole data and beginning portion data of contents on a user-by-user basis in one apparatus. In this case, the storage area, for example, may be divided equally among users, or by learning the use ratio of this apparatus among users, the distribution of the storage area among the respective users may be automatically set by this use ratio. For example, if the above DVR 1 is shared among a user A, a user B, and a user C and the use ratio of the DVR 1 among the respective users is A:B:C=3:2:1, the distribution of the storage area of the HDD 21 among the respective users is set to 3:2:1.

In the above embodiment, it is also possible that the respective CPUs of the DVR 1, the DVR 2, and the portable TV 5 mutually monitor whether or not these respective apparatuses are in a power-on state, and when judging that any apparatus as a monitor target is not in the power-on state, transmit a signal allowing this apparatus to be powered on to this apparatus. Consequently, even when the apparatus of the opposite party is not in the power-on state, content data, beginning portion data, and subsequent portion data can be received after it is powered on, which makes it possible to promptly reproduces a user's desired content independently of whether or not the apparatus of the opposite party is powered on.

In the above embodiment, the usage trend data 34 is created by the DVR 1 learning the user's usage trend, for example, with reference to the number of times of reproduction of respective contents, categories in the content metadata 33, and so on, but it may be set by the user directly inputting information including desired categories, performers, and so on.

Further, even if only one category is set, for example, it is also possible to, according to the available storage capacity of the HDD, store whole data until a predetermined capacity is reached and thereafter store only beginning portion data.

Further, it is also possible to set contents to be received in the usage trend data, for example, according to keywords in digests, performers' names, or the like independently of categories. In this case, it is recommended to, for example, make setting of a first set performer and a second set performer in the case of the performers' names, or a first set keyword and a second set keyword in the case of the keywords, and receive content data of the entire content regarding a content in which the first set performer appears or a content including the first set keyword, and beginning portion data regarding a content in which the second set performer appears or a content including the second set keyword, respectively. Moreover, especially in the portable TV 5, set performers and set keywords are further divided into an outdoor application and an indoor application, and the data of the entire content and the beginning portion data are received according to these applications.

In the above embodiment, when receiving the content from the DVR 2, the DVR 1 transmits the transmission request signal for the content at a timing when the available storage capacity of the HDD 21 of the DVR 1 appears, but the timing is not limited to this timing, and, for example, it is also possible that the DVR 2 receives content data with a new title via the digital tuner, records it on its own HDD, and updates the content list at which stage the DVR 2 transmits notification information to this effect to the DVR 1, and in response to this, the DVR 1 receives the updated content list.

In the above embodiment, the whole data of the content regarding the content of the first set category, and the beginning portion data of the content regarding the content of the second set category are received from the respective apparatuses and stored, but it is also possible to receive first beginning portion data with a predetermined capacity from a beginning portion instead of the whole data regarding the content of the first set category, and second beginning portion data with a capacity smaller than the first beginning portion data regarding the content of the second set category. This can further suppress the storage capacity.

Moreover, the DVR 1 may perform setting of three or more levels instead of setting of two levels such as the first set category and the second set category in the above embodiment and determine the capacity of the content to be received according to these levels. For example, when three levels are set, it is only necessary to make the data capacity of the content to be received variable, for example, as follows: whole data of the content in the case of the first setting, half data from the beginning in the case of the second setting, and data of a predetermined portion from the beginning in the case of the third setting. Consequently, the user's priorities for contents can be more closely met.

Further, the DVR 1 may receive middle portion data of the content instead of receiving the data of the predetermined portion from the beginning of the content as in the above embodiment. For example, the DVR 1 may receive data of a climax portion (highlight scene portion) detected from within the content in the DVR 2 or data of a digest portion (a portion summarizing the contents of the content) created in the DVR 2. Consequently, when the user does not want to watch all of the content but wants to know a highlight scene or the digest contents, the storage capacity can be saved by storing only the above middle portion and reproduction of the data of the above middle portion can be immediately started, resulting in an improvement in user friendliness.

In the above embodiment, the network 6 is constituted by the home LAN, but it is, of course, possible that contents may be exchanged not only at home but also, for example, by connecting the user's home, the outside of the user's home, the office, and so on by the Internet.

In the above embodiment, the description is given with the system in which two digital video recorders, two digital televisions, and one portable television as electronic apparatuses are connected by the network as an example, but the types and numbers of electronic devices connected to the network are not limited to the above. For example, PCs, game machines, or the like may be used in place of the above DVRs 1 and 2, and a portable telephone, a PDA, a notebook PC, a portable DVD player, a portable game machine, or the like may be used in place of the above portable TV 5. The system can be constructed by connecting various electronic apparatuses other than the above apparatuses.

Further, in the above embodiment, the description is given with the video content of the broadcast program as an example of the content, but the content is not limited to the above, and various contents including an audio content such as music, a text content such as an electronic book, and so on can be used.

It should be understood by those skilled in the art that various modifications, combinations, sub-combinations and alternations may occur depending on design requirements and other factors insofar as they are within the scope of the appended claims or the equivalents thereof.

The invention claimed is:

1. An electronic apparatus communicable with another electronic apparatus via a network, comprising:
   first storing means for storing priority information on priorities of contents capable of being used in the electronic apparatus;
   receiving means for receiving a list of contents stored in the other electronic apparatus with an attribute information indicating attribute of each of the contents in the list from the other electronic apparatus;
   determining means for determining whether a content in the list is a first content with a first priority or a second content with a second priority lower than the first priority based on the stored priority information, the received list and the received attribute information;
   a reception controlling means for causing a whole data of the first content to be received from the other electronic apparatus by the receiving means if the content in the list is determined to be the first content and for causing a beginning portion data, which is a predetermined portion from the beginning of the second content, to be received from the other electronic apparatus by the receiving means if the content in the list is determined to be the second content as a result of the determination;
   second storing means for storing at least one of the whole data and the beginning portion data; and
   a reproduction controlling means (i) for causing the stored whole data of the first content to be reproduced, and (ii) for causing a subsequent portion data of the second content, that is the data following the beginning portion thereof, to be received from the other electronic apparatus by the receiving means while the stored beginning portion data is being reproduced and to be reproduced following the reproduction of the beginning portion data such that the second content is reproduced by use of the beginning portion data and the subsequent portion data in a continuous manner from the beginning thereof without duplicating any portions thereof.

2. The electronic apparatus as set forth in claim 1,
   wherein the first storing means stores reproduction history information on the first and the second contents reproduced by the reproduction controlling means,
   the electronic apparatus further comprises generating means for generating the priority information based on the reproduction history information.

3. The electronic apparatus as set forth in claim 1,
   wherein the first storing means stores the whole data and content titles in association with each other as a content list, and stores the beginning portion data and the content titles in association with each other as a beginning list, and
   wherein the determining means receives an input of a user operation requesting reproduction of the content with the content title of the content and determines whether the inputted user operation is an operation requesting reproduction of either the first content or the second content based on the stored content list and beginning list,
   the electronic apparatus further comprises means for transmitting a transmission request signal requesting transmission of the subsequent portion data to the other electronic apparatus if the user operation is determined to be the operation requesting the reproduction of the second content as a result of the determination.

4. The electronic apparatus as set forth in claim 1,
wherein the receiving means receives notification information notifying that the content has been stored in the other electronic apparatus,
the electronic apparatus further comprises means for transmitting a transmission request signal requesting transmission of the list and attribute information to the other electronic apparatus based on the received notification information.

5. The electronic apparatus as set forth in claim 1, further comprising:
means for calculating an available storage capacity of the second storing means; and
means for transmitting a transmission request signal requesting transmission of the list and the attribute information to the other electronic apparatus if the available storage capacity increases.

6. The electronic apparatus as set forth in claim 1,
wherein the first storing means stores the priority information of a plurality of users,
wherein the receiving means receives the whole data and the beginning portion data with respect to each of the users based on the priority information of each of the users, and
wherein the second storing means stores the whole data and the beginning portion data with respect to each of the users.

7. The electronic apparatus as set forth in claim 1, further comprising:
means for judging whether the other electronic apparatus is in a power-on state; and
means for transmitting a signal allowing the other electronic apparatus to be powered on to the other electronic apparatus if the other electronic apparatus is judged to be not in the power-on state.

8. A content reproducing system comprising a first electronic apparatus and a second electronic apparatus which are communicable via a network,
wherein the first electronic apparatus includes:
first storing means for storing priority information on priorities of contents capable of being used in the first electronic apparatus,
receiving means for receiving a list of the contents stored in the second electronic apparatus with an attribute information indicating attribute of each of the contents in the list from the second electronic apparatus;
determining means for determining whether a content in the list is a first content with a first priority or a second content with a second priority lower than the first priority based on the stored priority information, the received list and the received attribute information,
transmitting means for transmitting a first transmission request signal requesting transmission of whole data of the first content to the second electronic apparatus if the content in the list is determined to be the first content as a result of the determination, and transmitting a second transmission request signal requesting transmission of a beginning portion data, which is a predetermined portion from the beginning of the second content, to the second electronic apparatus if the content in the list is determined to be the second content as the result of the determination,
reception controlling means for causing the whole data and the beginning portion data to be received from the second electronic apparatus by the receiving means,
second storing means for storing the received whole data and the beginning portion data, and
reproduction controlling means (i) for causing the stored whole data of the first content to be reproduced and (ii) for causing a third transmission request signal requesting transmission of a subsequent portion data of the second content following the beginning portion data to be transmitted to the second electronic apparatus by the transmitting means and for causing the subsequent portion data to be received by the receiving means while the beginning portion data is being reproduced and to be reproduced following the reproduction of the beginning portion data such that the second content is reproduced by use of the beginning portion data and the subsequent portion data in a continuous manner from the beginning thereof without duplicating any portions thereof, and
wherein the second electronic apparatus includes:
storing means for storing the contents with the list and the attribute information,
transmitting means for transmitting the stored list and attribute information to the first electronic apparatus,
receiving means for receiving the first, the second, and the third transmission request signals, and
transmission controlling means for causing the whole data to be transmitted to the first electronic apparatus by the transmitting means based on the received first, the second, and the third transmission request signals, for causing the beginning portion data to be generated from the content and to be transmitted to the first electronic apparatus by the transmitting means, and for causing the subsequent portion data to be generated from the content and transmitted to the first electronic apparatus by the transmitting means.

9. A content reproducing method by which an electronic apparatus communicable with another electronic apparatus via a network reproduces a content, the method comprising:
storing priority information on priorities of contents capable of being used in the electronic apparatus;
receiving a list of the contents stored in the other electronic apparatus with an attribute information indicating attribute of each of the contents in the list from the other electronic apparatus;
determining whether a content in the list is a first content with a first priority or a second content with a second priority lower than the first priority based on the stored priority information, the received list and the received attribute information;
receiving whole data of the first content from the other electronic apparatus if the content in the list is determined to be the first content as a result of the determination, and receiving a beginning portion data, which is a predetermined portion from a beginning of the second content, from the other electronic apparatus if the content in the list is determined to be the second content as the result of the determination;
storing at least one of the received whole data and the beginning portion data; and
causing the stored whole data of the first content to be reproduced and causing a subsequent portion data of the second content following the beginning portion data to be received from the other electronic apparatus while the stored beginning portion data is being reproduced and reproduced following the reproduction of the beginning portion data such that the second content is reproduced by use of the beginning portion data and the subsequent portion data in a continuous manner from the beginning thereof without duplicating any portions thereof.

10. A computer readable memory having stored thereon a program that causes an electronic apparatus to function as an apparatus communicable with another electronic apparatus via a network, the program comprising:

storing priority information on priorities of contents capable of being used in the electronic apparatus;

receiving a list of the contents stored in the other electronic apparatus with an attribute information indicating attribute of each of the contents in the list from the other electronic apparatus;

determining whether a content in the list is a first content with a first priority or a second content with a second priority lower than the first priority based on the stored priority information, the received list and the received attribute information;

receiving whole data of the first content from the other electronic apparatus if the content in the list is determined to be the first content as a result of the determination, and receiving a beginning portion data, which is a predetermined portion from a beginning of the second content, from the other electronic apparatus if it is determined that the content in the list is the second content as the result of the determination;

storing at least one of the received whole data and the beginning portion data; and causing the stored whole data of the first content to be reproduced and causing a subsequent portion data of the second content following the beginning portion data to be received from the other electronic apparatus while the stored beginning portion data is being reproduced and to be reproduced following the reproduction of the beginning portion data such that the second content is reproduced by use of the beginning portion data and the subsequent portion data in a continuous manner from the beginning thereof without duplicating any portions thereof.

11. An electronic apparatus communicable with another electronic apparatus via a network, comprising:

first storing unit to store priority information on priorities of contents capable of being used in the electronic apparatus;

receiving unit to receive a list of contents stored in the other electronic apparatus with an attribute information indicating attribute of each of the contents in the list from the other electronic apparatus;

determining unit to determine whether a content in the list is a first content with a first priority or a second content with a second priority lower than the first priority based on the stored priority information, the received list and the received attribute information;

a reception controlling unit to cause a whole data of the first content to be received from the other electronic apparatus by the receiving unit if the content in the list is determined to be the first content and to cause a beginning portion data, which is a predetermined portion from the beginning of the second content, to be received from the other electronic apparatus by the receiving unit if the content in the list is determined to be the second content as a result of the determination;

second storing unit to store at least one of the whole data and the beginning portion data; and a reproduction controlling unit (i) to cause the stored whole data of the first content to be reproduced, and (ii) to cause a subsequent portion data of the second content, that is the data following the beginning portion, to be received from the other electronic apparatus by the receiving unit while the stored beginning portion data is being reproduced and to be reproduced following the reproduction of the beginning portion data such that the second content is reproduced by use of the beginning portion data and the subsequent portion data in a continuous manner from the beginning thereof without duplicating any portions thereof.

12. A content reproducing system comprising a first electronic apparatus and a second electronic apparatus which are communicable via a network, wherein the first electronic apparatus includes:

first storing unit to store priority information on priorities of contents capable of being used in the first electronic apparatus, receiving unit to receive a list of the contents stored in the second electronic apparatus with an attribute information indicating attribute of each of the contents in the list from the second electronic apparatus;

determining unit to determine whether a content in the list is a first content with a first priority or a second content with a second priority lower than the first priority based on the stored priority information, the received list and the received attribute information, transmitting unit to transmit a first transmission request signal requesting transmission of whole data of the first content to the second electronic apparatus if the content in the list is determined to be the first content as a result of the determination, and transmitting a second transmission request signal requesting transmission of a beginning portion data, which is a predetermined portion from the beginning of the second content, to the second electronic apparatus if the content in the list is determined to be the second content as the result of the determination, reception controlling unit to cause the whole data and the beginning portion data to be received from the second electronic apparatus by the receiving unit, second storing unit to store the received whole data and the beginning portion data, and reproduction controlling unit to cause the stored whole data of the first content to be reproduced and to cause a third transmission request signal requesting transmission of a subsequent portion data of the second content following the beginning portion data to be transmitted to the second electronic apparatus by the transmitting unit and to cause the subsequent portion data to be received by the receiving unit while the beginning portion data is being reproduced and to be reproduced following the reproduction of the beginning portion data such that the second content is reproduced by use of the beginning portion data and the subsequent portion data in a continuous manner from the beginning thereof without duplicating any portions thereof, and wherein the second electronic apparatus includes:

storing unit to store the contents with the list and the attribute information, transmitting unit to transmit the stored list and attribute information to the first electronic apparatus, receiving unit to receive the first, the second, and the third transmission request signals, and transmission controlling unit to cause the whole data to be transmitted to the first electronic apparatus by the transmitting unit based on the received first, the second, and the third transmission request signals, to cause the beginning portion data to be generated from the content and to be transmitted to the first electronic apparatus by the transmitting unit, and to cause the subsequent portion data to be generated from the content and transmitted to the first electronic apparatus by the transmitting unit.

* * * * *